(12) United States Patent
Liu et al.

(10) Patent No.: US 8,680,341 B2
(45) Date of Patent: Mar. 25, 2014

(54) ARYLALKENYL ETHER OLIGOMERS AND POLYMERS AND THEIR USE IN THE PRODUCTION OF FLAME RETARDANTS

(75) Inventors: Frank Liu, West Lafayette, IN (US); Kenneth Bol, West Lafayette, IN (US); Mark V. Hanson, West Lafayette, IN (US); Larry Timberlake, West Lafayette, IN (US)

(73) Assignee: Chemtura Corporation, Middlebury, CT (US)

( * ) Notice: Subject to any disclaimer, the term of this patent is extended or adjusted under 35 U.S.C. 154(b) by 610 days.

(21) Appl. No.: 12/815,086

(22) Filed: Jun. 14, 2010
(Under 37 CFR 1.47)

(65) Prior Publication Data

US 2010/0324219 A1 Dec. 23, 2010

Related U.S. Application Data

(60) Provisional application No. 61/218,150, filed on Jun. 18, 2009.

(51) Int. Cl.
| | | |
|---|---|---|
| *C08G 65/00* | (2006.01) | |
| *C08G 65/34* | (2006.01) | |
| *C08G 65/48* | (2006.01) | |
| *C09K 21/14* | (2006.01) | |

(52) U.S. Cl.
USPC ........... 568/649; 106/316; 528/216; 568/639; 568/645; 568/647; 568/651; 568/655; 568/663

(58) Field of Classification Search
USPC ........... 525/185; 106/316; 528/216; 568/649, 568/639, 645, 647, 651, 655, 663
See application file for complete search history.

(56) References Cited

U.S. PATENT DOCUMENTS

| | | | |
|---|---|---|---|
| 4,079,034 A | 3/1978 | Lemper et al. | |
| 4,258,175 A | 3/1981 | Chen | |
| 5,530,044 A | 6/1996 | Mack et al. | |
| 2006/0189774 A1* | 8/2006 | Parthiban et al. | 526/335 |
| 2008/0269416 A1 | 10/2008 | Timberlake et al. | |

OTHER PUBLICATIONS

Percec et al.: "Functional polymers and sequential copolymers by phase transfer catalysis, 1" Makromolekulare Chemie, vol. 185, Apr. 1, 1984, pp. 617-627, XP002597883.
Database Caplus [Online] Chemical Abstracts Service, Columbus, Ohio, US; Jun. 23, 1984, Nguyen et al.: cf. V"Synthesis of polyethers by phase-transfer catalyzed polycondensation" XP002597910 retrieved from STN Database accession No. 1984:210504; & Nguyen et al.: "Synthesis of Polyesters by Phasetransfer Catalyzed PolYcondensation" Polymer Science and Technology, vol. 24, Jan. 1, 1984, pp. 59-67, XP009137907.

* cited by examiner

*Primary Examiner* — Kelechi Egwim
(74) *Attorney, Agent, or Firm* — Joseph Suhadolnik; George Romanik; Chemtura Corporation

(57) ABSTRACT

An arylalkenyl ether oligomer is produced by the reaction of a polyhaloalkene with a polyhydroxyaryl compound. Halogenation of the resultant oligomer produces a flame retardant having both aromatic and aliphatic bromine groups.

13 Claims, No Drawings

ARYLALKENYL ETHER OLIGOMERS AND POLYMERS AND THEIR USE IN THE PRODUCTION OF FLAME RETARDANTS

CROSS REFERENCE TO RELATED APPLICATIONS

This application claims the benefit of the filing date of U.S. Provisional Application No. 61/218,150 filed Jun. 18, 2009, the entire contents of which are incorporated herein by reference.

FIELD

This invention relates to arylalkenyl ether oligomers and polymers, their synthesis and their use in the production of halogenated flame retardants.

BACKGROUND

Decabromodiphenyl oxide (deca) and decabromodiphenylethane (deca-DPE) are commercially available materials widely used to flame retard various polymer resin systems. The structure of these materials is as follows:

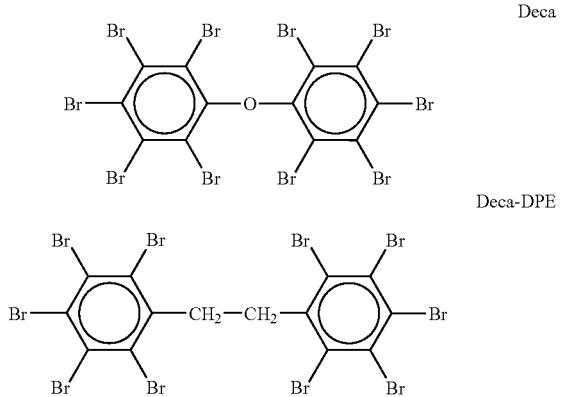

One of the advantages of using deca and deca-DPE in polymer resins that are difficult to flame retard, such as high-impact polystyrene (HIPS) and polyolefins, is that the materials have a very high (82-83%) bromine content. This allows a lower load level in the overall formulation, which in turn serves to minimize any negative effects of the flame retardant on the mechanical properties of the polymer.

Despite the commercial success of deca, there remains significant interest in developing alternative halogenated flame retardant materials that are higher molecular weight oligomers or polymers. Such oligomers or polymers may provide improved properties, such as providing non-blooming formulations, or better mechanical properties. For example, these types of material tend to become entangled in the base resin polymer matrix, depending on the compatibility between the resin and the flame retardant, and hence should show fewer tendencies to bloom. This would in general give a more inherently "environmentally friendly" material, as it would not be as easily transferred to the surrounding environment.

There are a number of commercially available flame retardant materials that can be considered oligomers or polymers of halogenated aryl monomers. Examples of these monomers include tetrabromobisphenol A (TBBPA) and dibromostyrene (DBS), which have the following structures:

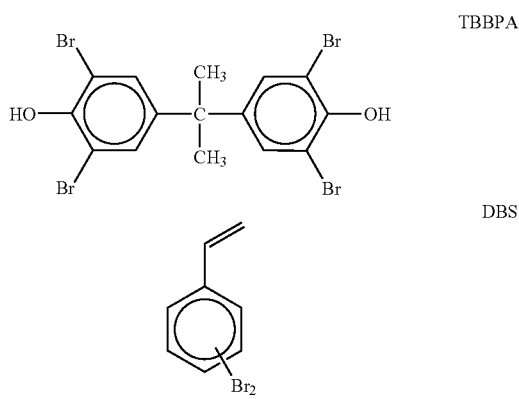

Commercially, TBBPA and DBS are typically not used in their monomeric form, but are converted into an oligomeric or polymeric species. One class of oligomers is the brominated carbonate oligomers based on TBBPA. These are commercially available from Chemtura Corporation (examples include Great Lakes BC-52™, Great Lakes BC-52HP™, and Great Lakes BC-58™) and by Teijin Chemical (FireGuard 7500 and FireGuard 8500). These products are used primarily as flame retardants for polycarbonate and polyesters.

Brominated epoxy oligomers, based on condensation of TBBPA and epichlorohydrin, are commercially available and sold by Dainippon Ink and Chemicals under the Epiclon® series, and also by ICL Industrial Products (examples are F-2016 and F-2100) and other suppliers. The brominated epoxy oligomers find use as flame retardants for various thermoplastics both alone and in blends with other flame retardants.

Another class of brominated polymeric flame retardants based on TBBPA is exemplified by Teijin FG-3000, a copolymer of TBBPA and 1,2-dibromoethane. This aralkyl ether finds use in ABS and other styrenic polymers. Alternative end-groups, such as aryl or methoxy, on this polymer are also known as exemplified by materials described in U.S. Pat. No. 4,258,175 and U.S. Pat. No. 5,530,044. The non-reactive end-groups are claimed to improve the thermal stability of the flame retardant.

TBBPA is also converted into many other different types of epoxy resin copolymer oligomers by chain-extension reactions with other difunctional epoxy resin compounds, for example, by reaction with the diglycidylether of bisphenol A. Typical examples of these types of epoxy resin products are D.E.R.™ 539 by the Dow Chemical Company, or Epon™ 828 by Hexion Corporation. These products are used mainly in the manufacture of printed circuit boards.

DBS is made for captive use by Chemtura Corporation and is sold as several different polymeric species (Great Lakes PDBS-80™, Great Lakes PBS-64HW™, and Firemaster CP44-HF™) to make poly(bromostyrene) type flame retardants. These materials represent homopolymers or copolymers. Additionally, similar brominated polystyrene type flame retardants are commercially available from Albemarle Chemical Corporation (Saytex® HP-3010, Saytex® HP-7010, and PyroChek 68PB). All these polymeric products are used to flame retard thermoplastics such as polyamides and polyesters.

In our U.S. Patent Application Publication No. 2008/0269416, we have proposed a series of flame retardant materials that are based on halogenated aryl ether oligomers comprising the following repeating monomeric units:

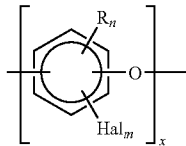

wherein R is hydrogen or alkyl, especially $C_1$ to $C_4$ alkyl, Hal is halogen, normally bromine, m is at least 1, n is 0 to 3 and x is at least 2, such as 3 to 100,000. The oligomer precursors are produced by oligomerization of a hydroxyhaloaryl material, such as bromophenol, or by reaction of a dihalo aryl material, such as dibromobenzene, with a dihydroxyaryl material, such as resorcinol, using an ether synthesis, such as the Ullmann ether synthesis. Bromination of the resulting oligomers produces materials that are halogenated to a higher level than other currently available oligomeric flame retardants and that provide superior mechanical properties when combined with resins such as HIPS and polyolefins as well as engineering thermoplastics such as polyamides and polyesters. It is also found that these aryl ether oligomers, even at lower levels of halogenation, give formulations with acceptable mechanical properties.

All of the polymeric or oligomeric flame retardant materials discussed above are based on aromatic bromine, which has a higher thermal stability than an aliphatic bromine material. For this reason, one of the disadvantages of existing halogenated aromatic polymeric flame retardants is that they are only effective in reducing the flammability of the host resin material at relatively high temperatures. For certain host resin materials, such as polyolefins, it would be desirable to have a flame retardant that exhibits the physical properties of brominated polymers but has a flame retardant mechanism that is effective at lower temperatures than conventional halogenated aromatic polymers.

According to the present invention, it has now been found that by reacting a polyhaloalkene with a polyhydroxyaryl compound, or more preferably a halogenated polyhydroxyaryl compound, such as tetrabromobisphenol A (TBBPA), it is possible to produce an arylalkenyl ether oligomer/polymer. This oligomer contains olefinic unsaturation and so, on halogenation, especially bromination, it produces a halogenated arylalkyl ether oligomer/polymer having both aliphatic and aromatic halide groups. As a result the halogenated product combines the advantageous physical and high temperature flame retardant properties of conventional halogenated aromatic polymers with the lower temperature flame retardant properties of halogenated aliphatic molecules.

U.S. Pat. No. 4,079,034 discloses a flame retardant additive comprising an aromatic polyester of an aromatic dicarboxylic acid and a halogenated bisphenol having the formula:

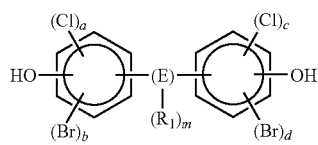

wherein E is a divalent alkylene, haloalkylene, cycloalkylene, halocycloalkylene, arylene, haloarylene, —O—, —S—, —SO—, —SO$_2$—, —SO$_3$—, —CO—,

or $R_5N<$; $R_1$ is alkyl, haloalkyl, aryl, haloaryl, alkylaryl, haloalkylaryl, arylalkyl, haloarylalkyl, cycloalkyl, or halocycloalkyl; $R_4$ and $R_5$ are independently selected from hydrogen, $R_1$ and $OR_1$; m is an integer from 0 to the number of replaceable hydrogen atoms on E; a, b, c and d are 0 to 4; and a+b is 1 to 4 and c+d is 1 to 4.

SUMMARY

In one aspect, the invention resides in an arylalkenyl ether oligomer produced by the reaction of a polyhaloalkene with a polyhydroxyaryl compound.

In a further aspect, the invention resides in a flame retardant halogenated aryl ether oligomer produced by halogenation of the reaction product of a polyhaloalkene with a polyhydroxyaryl compound.

Conveniently, the polyhydroxyaryl compound is halogenated, preferably brominated, and generally is dihydroxyaryl compound. In one embodiment, the polyhydroxyaryl compound is a halogenated bisphenol compound, such as tetrabromobisphenol A.

Conveniently, the polyhaloalkene is 1,4-dibromo-2-butene or 1,4-dichloro-2-butene.

In yet a further aspect, the invention resides in a arylalkenyl ether oligomer having the formula:

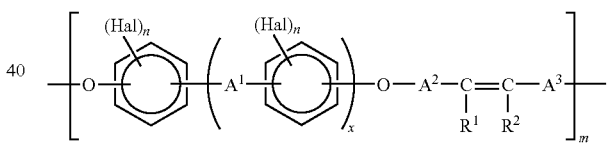

where each Hal, if present, is a halide group;
$A^1$, if present, is selected from O, S, SO$_2$, a single bond, and an alkylidene group;
each $A^2$ and $A^3$ is a $C_1$ to $C_7$ alkyl group, especially a $C_1$ to $C_4$ alkyl group;
each $R^1$ and $R^2$ is independently selected from hydrogen and a $C_1$ to $C_6$ alkyl group;
m is 2 to about 100;
n is 0 to 4; and
x is 0 or 1.

In still yet a further aspect, the invention resides in a flame retardant halogenated arylalkyl ether oligomer having the formula:

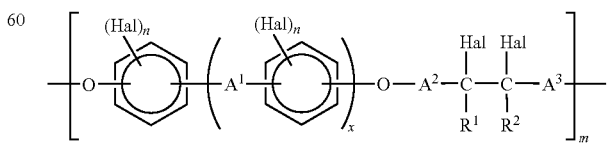

where each Hal is a halide group;

$A^1$, if present, is selected from O, S, SO$_2$, a single bond, and an alkylidene group;

each $A^2$ and $A^3$ is a C$_1$ to C$_7$ alkyl group, especially a C$_1$ to C$_4$ alkyl group;

each R$^1$ and R$^2$ is independently selected from hydrogen and a C$_1$ to C$_6$ alkyl group;

m is 2 to about 100;

n is 1 to 4; and x is 0 or 1.

Conveniently, each Hal is a bromide group.

Conveniently, x is 1 and A$^1$ is an alkylidene group having about 1 to about 6 carbon atoms and typically is an isopropylidene group.

In one embodiment, the oligomer is terminated with a bromophenol group.

In another aspect, the invention resides a flame-retardant resin composition comprising a base resin and a flame retardant halogenated arylalkyl ether oligomer as described herein.

Conveniently, the base resin comprises at least one of a polyolefin and a polystyrene, especially high impact polystyrene.

DESCRIPTION OF THE EMBODIMENTS

The terms "oligomer" and "polymer" are used interchangeably herein to mean a compound formed by oligomerization of one or more monomers so as to have repeating units derived from said monomer(s) irrespective of the number of said repeating units. Because the arylalkenyl ether precursor used to the produce the present flame retardant is produced by an oligomerization process, the precursor and the halogenated product will generally have a distribution of molecular weight. In particular, the oligomer generally has an average of at least 3 repeating units and typically at least 5 repeating units, with the average molecular weight of the halogenated oligomer being up to 100,000 Daltons.

Described herein is arylalkenyl ether oligomer produced by the reaction of a polyhaloalkene with a polyhydroxyaryl compound. Also described herein is halogenation of the resultant arylalkenyl ether oligomer to produce a halogenated aryl ether oligomer useful as a flame retardant.

Suitable polyhaloalkenes for use in producing the arylalkenyl ether oligomer precursor are dihaloalkenes having about 2 to about 10 carbon atoms and especially α,ω-dihaloalkenes of the formula:

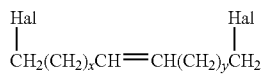

wherein each Hal is a halide group, such as a bromide or chloride group, and each of x and y is an integer between 0 and 6. Generally each of x and y is an integer between 0 and 2. In one embodiment, the dihaloalkene comprises 1,4-dibromo-2-butene or 1,4-dichloro-2-butene. In certain cases the dihaloalkene may contain multiple double bonds, conjugated or unconjugated. This would aid in the selection of the bromo-aryl/bromo-alkyl ratio and hence control of the flame retardant properties of the final halogenated aryl ether oligomer.

Suitable polyhydroxyaryl compounds for use in producing the arylalkenyl ether oligomer precursor are substituted or unsubstituted dihydroxyaryl compounds of the formula:

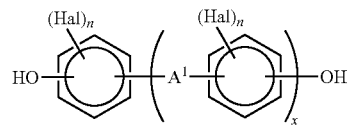

wherein each Hal, if present, is a halide group, such as a bromide or chloride group, preferably a bromide group, n is 0 to 4, x is 0 or 1, and A$^1$, if present, is selected from O, S, SO$_2$, a single bond, and an alkylidene group, typically having from about 1 to about 6 carbon atoms and preferably being a isopropylidene group. In one embodiment, x is 1 and the polyhydroxyaryl compound is a halogen substituted bisphenol compound, such as tetrabromobisphenol A.

To produce the present flame retardant, the polyhaloalkene and polyhydroxyaryl compounds described above are initially reacted together using the Williamson ether synthesis. This typically involves reacting the phenolic material with base, followed by addition of the dihalo olefin, usually at a reaction temperature below 100° C. An illustration of this reaction based on tetrabromobisphenol A and 1,4-dibromo-2-butene is shown in Scheme (I), where the resulting oligomer is subsequently reacted with bromine.

Scheme (I). Illustrative Reaction.

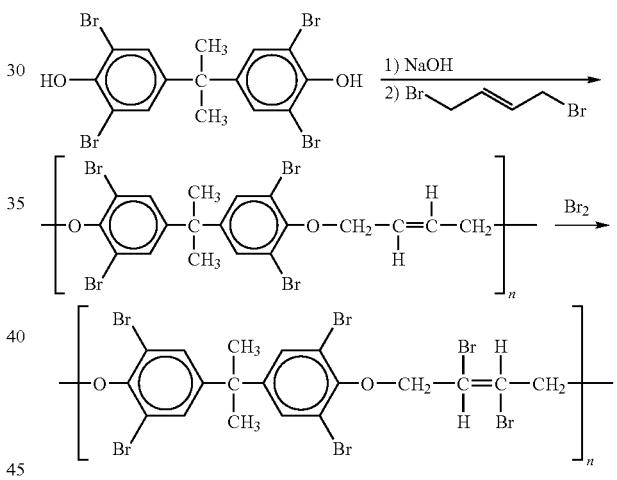

Conveniently, the reaction can be conducted as an aqueous-organic emulsion polymerization process using a phase-transfer catalyst, such as tetrabutylammonium hydrogen sulfate, in a multi-phase system such as toluene-water. Or, alternatively, the reaction can be conducted in a single phase solvent, such as N,N-dimethylformamide.

The base used in the ether synthesis reaction is capable of displacing protons from acidic phenol groups (i.e. hydroxyl groups) on the polyhydroxyaryl compound. The displaced protons may be substituted with cations, particularly monovalent cations, from the base to form a salt. Example of a suitable bases include sodium hydroxide, potassium hydroxide and sodium carbonate The polyhydroxyaryl compound is converted into a salt by the addition of the base. The salt may be a mono-salt (i.e. a compound having one terminal monovalent cation and one terminal hydroxyl group) or a di-salt (i.e. a compound having two terminal monovalent cations and no terminal hydroxyl groups) or a mixture of mono-salts and di-salts.

The product of the ether synthesis reaction is an arylalkenyl ether oligomer containing olefinic unsaturation resulting from the alkene moiety in the polyhaloalkene starting material. Depending on the polyhydroxyaryl compound used to react with the polyhaloalkene, the product may also contain aromatic unsaturation. Typically, the product has the following formula:

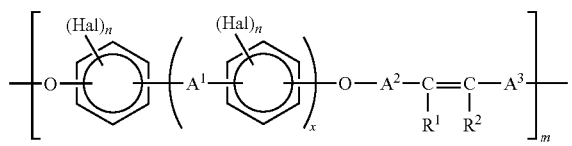

where each Hal, if present, is a halide group and preferably a bromide group;
$A^1$, if present, is selected from O, S, $SO_2$, a single bond, and an alkylidene group, especially an alkylidene group having about 1 to about 6 carbon atoms, such as an isopropylidene group;
each $A^2$ and $A^3$ is a $C_1$ to $C_7$ alkyl group, especially a $C_1$ to $C_4$ alkyl group;
each $R^1$ and $R^2$ is independently selected from hydrogen and a $C_1$ to $C_6$ alkyl group;
m is 2 to about 100;
n is 0 to 4; and
x is 0 or 1.

To produce the desired flame retardant, the product is then halogenated, typically brominated, under conditions such that the halogen reacts with the olefinic group to produce aliphatic halide substituents and preferably also reacts with any aromatic unsaturated groups to produce some or additional aromatic halide substituents.

Halogenation of the arylalkenyl ether oligomer is generally achieved by adding bromine to the oligomer, conveniently with the oligomer being dissolved in an organic solvent, to form a reaction composition which is then reacted at a temperature between about 20° C. and about 80° C. to form a halogenated product containing the desired brominated aryl ether oligomer, the solvent and unreacted bromine The reaction is complete when the bromine uptake ceases or, in the case of concomitant aryl bromination, when the release of hydrogen bromide from the reaction composition ceases, typically after about 2 to about 4 hours. Any released hydrogen bromide is removed in a scrubber.

Generally a Lewis acid catalyst, such as aluminum chloride, is added to the reaction composition to facilitate the halogenation reaction, especially if aryl bromination is also desired. This can be achieved by adding the catalyst to the oligomer precursor solution prior to addition of the bromine, by combining the catalyst with the bromine and adding the combination to the oligomer precursor solution or by adding the catalyst to the reaction composition either at the beginning of the halogenation reaction or part of the way through the reaction, for example when initial liberation of hydrogen bromide starts to slow down.

When the halogenation reaction is complete, any unreacted bromine is removed from the reaction product, generally by distillation or by neutralization with a reducing agent. Suitable reducing agents include aqueous hydrazine and aqueous sodium bisulfite.

After removal of the unreacted bromine, the reaction product is isolated by precipitation into a non-solvent, such as methanol or isopropanol to produce a slurry of the halogenated arylalkyl ether oligomer mixture. Alternatively, the reaction product may be treated with hot water to flash off the solvent and leave the product as an aqueous slurry. The halogenated aryl ether oligomer can then be recovered from the slurry by filtration and drying. Typically, the resultant product has the following formula:

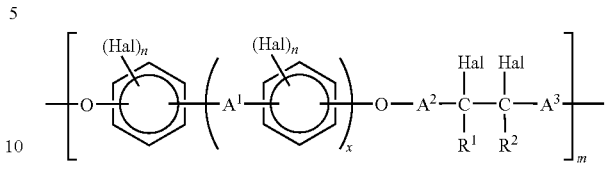

where each Hal is a halide group;
$A^1$, if present, is selected from O, S, $SO_2$, a single bond, and an alkylidene group, especially an alkylidene group having about 1 to about 6 carbon atoms, such as an isopropylidene group;
each $A^2$ and $A^3$ is a $C_1$ to $C_7$ alkyl group, especially a $C_1$ to $C_4$ alkyl group;
each $R^1$ and $R^2$ is independently selected from hydrogen and a $C_1$ to $C_6$ alkyl group;
m is 2 to about 100;
n is 1 to 4; and
x is 0 or 1.

In one embodiment, the oligomer is terminated with a phenol or more preferably a bromophenol group by addition of a monofunctional material, such as phenol, monobromophenol, dibromophenol and/or tribromophenol. This material terminates the oligomer chain reaction and provides one means to control molecular weight.

The resultant halogenated aryl ether oligomer can be used as a flame retardant for any flammable macromolecular material, although is particularly useful with polymer resin systems which require the flame retardant properties to be effective at relatively low temperatures, such as less than 250° C. Examples of suitable resin systems include polystyrene, such as high impact polystyrene, expanded and extruded polystyrene, polyolefins, olefin-based copolymers, such as ABS resin and polypropylene copolymers, and other thermoplastics or thermosets recognized as requiring flame retardancy by one skilled in the art. Particularly, preferred resin systems include polyolefins, polystyrene, and/or high-impact polystyrene (HIPS). With such polymers, the level of the halogenated oligomer in the polymer formulation required to give a V-0 classification when subjected to the flammability test protocol from Underwriters Laboratories is generally within the following ranges:

| Polymer | Useful | Preferred |
| --- | --- | --- |
| Polystyrene | 5 to 25 wt % | 10 to 20 wt % |
| Polypropylene | 20 to 50 wt % | 25 to 40 wt % |
| Polyethylene | 5 to 35 wt % | 20 to 30 wt %. |

Typical applications for polymer formulations containing the present halogenated aryl ether oligomer as a flame retardant include automotive molded components, adhesives and sealants, fabric back coatings, electrical wire and cable jacketing, and electrical and electronic housings, components and connectors. In the area of building and construction, typical uses for the present flame retardant include polystyrene insulating panels, self extinguishing polyfilms, wire jacketing for wire and cable, backcoating in carpeting and fabric including wall treatments, wood and other natural fiber-filled structural components, roofing materials including roofing membranes, roofing composite materials, and adhesives used to in construction of composite materials. In general consumer products the present flame retardant can be used in formulation of appliance parts, housings and components for both attended and unattended appliances where flammability requirements demand.

The invention will now be more particularly described with reference to the following Examples.

In the Examples, thermogravimetric analyses (TGA) were performed on 10 mg samples under nitrogen with a heat rate of 10° C./min using a TA instruments TGA Q500 instrument. Molecular weight determinations were conducted by GPC (gel-permeation chromatography) versus polystyrene standards using a Waters 2690 HPLC system with a Viscotek refractive index detector. Reported results are weight average molecular weight (Mw) and polydispersity (pd).

Example 1

Oligomer of TBBPA and 1,4-Dibromo-2-butene (DBB)

A 12-L flask equipped with a condenser, mechanical stirring, a temperature probe and heating mantle was charged with 1.7 L of deionized (DI) $H_2O$, 201.6 g NaOH (5.04 mol), and 560.0 g tetrabromobisphenol A (TBBPA, 1.03 mol) under nitrogen. The resultant reaction mixture was heated to 38° C. Separately, 215.6 g of trans-1,4-dibromo-2-butene (DBB, 1.01 mol) was dissolved in 910 mL of toluene, filtered and kept under nitrogen. Next, 980 mL of toluene was added to the reaction mixture and, after heating the mixture to 50° C., 17.4 g of TBAHS (tetrabutylammonium hydrogen sulfate 97%) was added. The DBB/toluene solution was then added to the reaction mixture via an addition funnel over a period of 21 minutes. The resulting cream colored slurry was heated to 70° C., maintained with vigorous stirring for 4 hour and then cooled to ambient temperature. The reaction mixture was precipitated into methanol and the solids were filtered and washed with methanol. The product solids were then slurried with water and concentrated HCl was added to adjust the pH to 6-7. The solids were dissolved in methylene chloride and reprecipitated into methanol, filtered, washed and dried (70° C.) to give 563.4 g of a white solid product (91.8% yield). Analysis: 52.4% organic bromine, mp 174° C., 5% TGA 235° C. (nitrogen), Tg 71° C. (DSC), GPC Mw=12,600, pd=2.24, NMR consistent with structure.

Example 2

Bromination of TBBPA-DBB Oligomer

A 12-L flask equipped with a condenser, mechanical stirring, a temperature probe and heating mantle was charged with 5.6 L $CH_2Cl_2$ and 560.0 g of TBBPA/DBB oligomer under nitrogen. The mixture was heated to 35° C. and 73.9 g of ethanol was added. Bromine (180.2 g) was added via an addition funnel over 6 minutes and the mixture was stirred at 35° C. for 4 hours. The mixture was allowed to cool slightly for 20 minutes and 35% aqueous hydrazine was added to quench the remaining bromine, giving an off-white cloudy mixture, which was stirred for 30 min. The reaction mixture was precipitated into methanol and the resulting slurry was filtered and washed with additional methanol and water. The solids were dissolved in methylene chloride and reprecipitated in methanol, filtered, washed, and dried to give 699.5 g (98.4% yield) of white solid product. Analysis: 61.2% organic bromine, mp 188° C., 5% TGA 290° C. (nitrogen), Tg 125° C. (DSC), GPC Mw=9,490, pd=3.06, NMR consistent with structure.

Example 3

Tribromophenol End-Capped Oligomer of TBBPA-DBB

A 500-mL flask equipped with a condenser, mechanical stirring, a temperature probe and heating mantle was charged with 92 mL DI $H_2O$, 11.0 g NaOH, 30.0 g TBBPA and 7.3 g of 2,4,6-tribromophenol (TBP). The resultant mixture was heated to 50° C. and 52 mL of toluene and 0.936 g of TBAHS were added. DBB (14.2 g) was dissolved in 59 mL of toluene, filtered and added to the reaction mixture via an addition funnel. The slurry was heated to 70° C. and maintained with stirring for 4 hours. The reaction mixture was cooled slightly and slowly poured into methanol to precipitate the product. The reaction mixture was filtered and the solids were washed with methanol. The product solids were then slurried with water and concentrated HCl was added to adjust the pH to 6-7. The solids were dissolved in methylene chloride and reprecipitated into methanol, filtered, washed and dried (55° C.) to give 39.2 g of white solid product. Analysis: 54.7% organic bromine, mp 179° C., 5% TGA 211° C. (nitrogen), Tg 50° C. (DSC), GPC Mw=5,010, pd=2.66, NMR consistent with structure.

Example 4

Low Molecular Weight TBBPA-DBB Oligomer

This reaction differed from Example 1 in that the mol ratio of DBB/TBBPA was changed from 1:1 to 1:1.5 (i.e. the DBB was used in excess). The amount of sodium hydroxide was also decreased from 5:1 NaOH:TBBPA to 2.9:1 mol ratio.

A 500-mL flask equipped with a condenser, mechanical stirring, a temperature probe and heating mantle was charged with 53 mL DI $H_2O$, 6.4 g NaOH and 30.0 g TBBPA. The mixture was heated to 50° C. and 50 mL toluene and 0.936 g TBAHS were added. DBB (17.7 g) was dissolved in 75 mL of toluene, filtered and added via an addition funnel to the reaction mixture. The slurry was held at 55° C. with stirring for 3.5 hours. The reaction mixture was cooled slightly and was slowly poured into methanol with rapid stirring to precipitate the product. The product was isolated in the same fashion as described in Example 1 and dried at 50° C. to give 33.4 g of white solid product. Analysis: 53.4% organic bromine, mp 168° C., 5% TGA 224° C. (nitrogen), Tg 53.5° C. (DSC), GPC Mw=3,390, pd=1.87, NMR consistent with structure.

Based on the previous Examples and on other similar reactions conducted, variables that influence the product molecular weight are summarized in Table 1.

TABLE 1

| Parameter | Molecular Weight |
|---|---|
| Increase NaOH | increases MW |
| Increase DBB | decreases MW |
| Substitute DCB[1] for DBB | decreases MW, decreases yield |
| Replace toluene with $CH_2Cl_2$ | increases MW greatly, increases yield |
| Replace NaOH w/$Na_2CO_3$ | decreases MW, increases yield |
| Decrease TBAHS | decreases MW |
| Decrease reaction temp | decreases yield |

[1]DCB = 1,4-dichloro-2-butene

In the following Examples, the reactions were run in a single-phase solvent system.

Example 5

Oligomer of TBBPA and
1,4-Dibromo-2-methyl-2-butene (DBMB)

TBBPA (228.3 g, 0.419 mol), sodium carbonate (132.5 g, 1.25 mol), and 1.5 L of DMF were charged to a reactor. DBMB (95.7 g, 0.419 mol) was charged to the reactor with stirring and the mixture was heated at 70° C. for 5 hr. The reaction mixture was poured into 3 L of water. The mixture was filtered and the filter cake washed with water. The cake was dried at 100° C. for 3 hours to give 259.0 g of a white powder. The powder was dissolved in 1,380 g of methylene chloride and reprecipitated into methanol to give the product. The product was filtered and dried to give 215.6 g of a white powder. Analysis: 51.7% organic bromine, 5% TGA 240° C. (nitrogen), GPC Mw=46,800, pd 13.5.

Example 6

Bromination of TBBPA-DBMB Oligomer

The oligomer of Example 5 (100 g) was dissolved in 1 L of methylene chloride. Bromine (26.2 g, 0.164 mol) was added over 40 min to the stirred solution at room temperature. The product was obtained by adding the methylene chloride reaction mixture to 3.5 L of isopropyl alcohol. The product was filtered and dried at 80° C. for 5 hours to give 131.1 g of a tan powder. Analysis: Organic bromine 58.9%, 5% TGA 185° C. (nitrogen), hydrolyzable bromide: 11.0%.

Example 7

Compounding of Brominated TBBPA-DBB
Oligomer of Example 2 in HIPS Resin

The material prepared as described in Example 2 was compounded with a high impact polystyrene (HIPS) resin formulation using a 25 mm twin-screw extruder operating at 195-205° C. barrel temperature and the compounded material was injection molded into test bars at 210° C. Similar test bars were produced using a standard decabromodiphenyl oxide (DE-83R) flame retardant formulation. The molded specimens were tested for various mechanical properties, as shown in Table 2, per standard ASTM methods. From these results, it can be shown that comparable mechanical properties are obtained with the brominated oligomer of Example 2 as compared with the DE-83R formulation, with the exception of the impact strength and tensile elongation. These data also demonstrate that the oligomer can function as a flame retardant material.

TABLE 2

|  | DE-83R | Ex 2 Oligomer |
|---|---|---|
| Formulation, % | | |
| DE-83R | 14 | |
| TBBPA-DBB Oligomer | | 20 |
| ATO | 3.5 | 3.5 |
| Kraton D1101 | 5 | 5 |
| Anox PP-18 | 0.2 | 0.2 |
| Flammability | | |
| UL-94 | V-0 | V-0 |
| Total burn time set of 5 (sec) | 6.5 | 0 |
| Mechanical Properties | | |
| Tensile Strength (psi) | 3549 | 3840 |
| Tensile Elongation (%) | 35.2 | 13.0 |
| Flexural Strength (kpsi) | 5.5 | 6.0 |
| Flexural Modulus (kpsi) | 292 | 313 |
| Notched Impact (ft-lb/in) | 2.37 | 0.68 |
| Heat Deflection Temp (° C.) @ 264 psi | 67.9 | 71.1 |
| Vicat, 10N (° C.) | 96.0 | 98.6 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A flame retardant halogenated aryl ether oligomer produced by halogenation of the reaction product of a polyhaloalkene with a halogenated polyhydroxyaryl compound.

2. The flame retardant of claim 1 wherein the halogenated polyhydroxyaryl compound used to produce said reaction product is a halogenated dihydroxyaryl compound.

3. The flame retardant of claim 1 wherein the halogenated polyhydroxyaryl compound used to produce said reaction product is brominated.

4. The flame retardant of claim 1 wherein the halogenated polyhydroxyaryl compound used to produce said reaction product is a halogenated bisphenol compound.

5. The flame retardant of claim 1 wherein the halogenated polyhydroxyaryl compound used to produce said reaction product comprises tetrabromobisphenol A.

6. The flame retardant of claim 1 wherein the polyhaloalkene used to produce said reaction product comprises 1,4-dibromo-2-butene or 1,4-dichloro-2-butene.

7. A flame-retardant resin composition comprising a base resin and a flame retardant halogenated aryl ether oligomer produced by halogenation of the reaction product of a polyhaloalkene with a halogenated polyhydroxyaryl compound.

8. The resin composition of claim 7 wherein the halogenated polyhydroxyaryl compound used to produce said reaction product is a halogenated dihydroxyaryl compound.

9. The resin composition of claim 7 wherein the halogenated polyhydroxyaryl compound used to produce said reaction product is brominated.

10. The resin composition of claim 7 wherein the halogenated polyhydroxyaryl compound used to produce said reaction product is a halogenated bisphenol compound.

11. The resin composition of claim 7 wherein the halogenated polyhydroxyaryl compound used to produce said reaction product comprises tetrabromobisphenol A.

12. The resin composition of claim 7 wherein the polyhaloalkene used to produce said reaction product is 1,4-dibromo-2-butene or 1,4-dichloro-2-butene.

13. The resin composition of claim 7 wherein the base resin comprises at least one of a polyolefin and a polystyrene.

* * * * *